(No Model.)

O. AVERY.
VEGETABLE OR MEAT CUTTER.

No. 510,310. Patented Dec. 5, 1893.

Witnesses
Geo. E. Frech.
Roland J. Fitzgerald.

Inventor
Oliver Avery
per
Lehmann Pattison Nesbit
attys.

UNITED STATES PATENT OFFICE.

OLIVER AVERY, OF GROTON, NEW YORK.

VEGETABLE OR MEAT CUTTER.

SPECIFICATION forming part of Letters Patent No. 510,310, dated December 5, 1893.

Application filed December 13, 1892. Serial No. 455,034. (No model.)

*To all whom it may concern:*

Be it known that I, OLIVER AVERY, of Groton, in the county of Tompkins and State of New York, have invented certain new and useful Improvements in Household Implements; and I do declare the following to be a full, clear, and exact description of the invention, such as will enable others skilled in the art to which it pertains to make and use it, reference being had to the accompanying drawings, which form a part of this specification.

My invention relates to improvements in household implements; and it consists in providing the implements with blades of the particular construction hereinafter shown and described, and which will be particularly referred to in the claims.

The object of my invention is to provide a cutter for household purposes, such as cutting vegetables, meats and other things into small pieces, for mincing and other purposes, and to provide the said cutter with blades which are preferably formed from sheet material in any desired manner to make them flexible, and cut away at their lower extremities so that their lower cutting edges are separated to form an opening, and to cut the inner upper edge of the blade away to form an enlarged opening for the free passage of the material being cut, whereby all clogging of the knife is entirely prevented, by the vibration of the blade which jars the material therefrom and the knives cut more freely owing to their being separated at their lower cutting edges.

Figure 1:
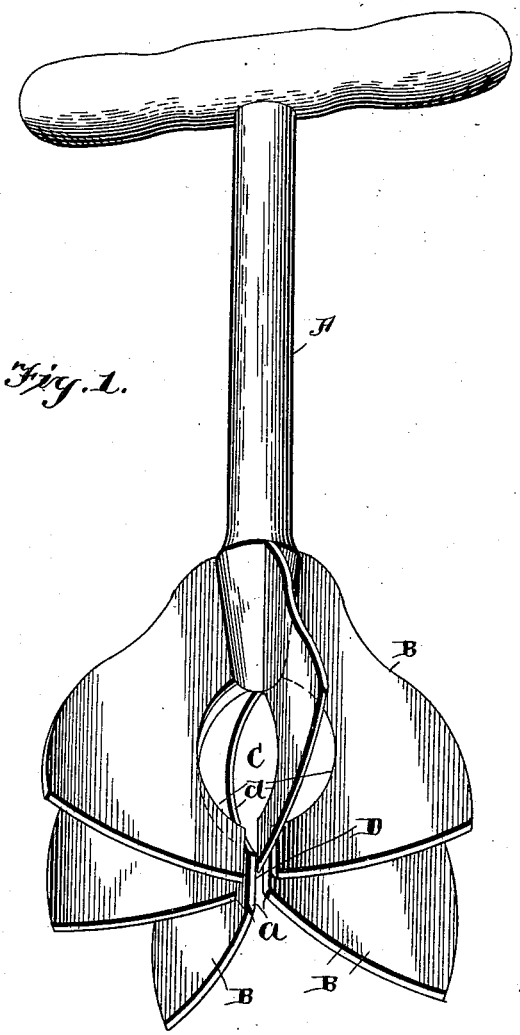
Figure 2:
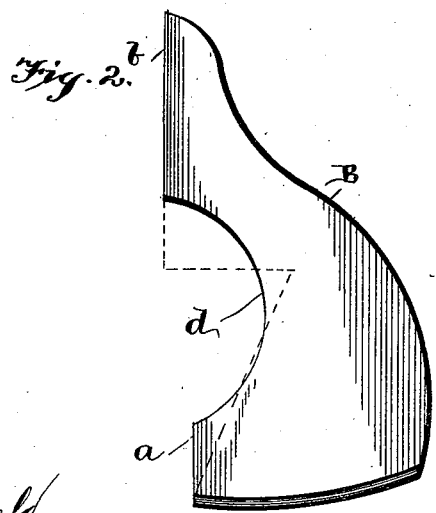

In the accompanying drawings:—Figure 1 is a perspective view of a cutter embodying my invention. Fig. 2 is a detail view showing the blade detached from the handle.

A indicates a stem preferably of metal, which is cast, and the upper ends of the blades B, are preferably cast into the lower end of the handle for cheapness. However, whether the handle be made of cast metal, or of wood, and whether the blades be attached to the handle by casting them therein, does not form any part of my invention, and so far as the manner of connecting the blades is concerned it does not in any way affect my construction of the blades.

By reference to Fig. 2 it will be seen that the lower inner edge $a$ of the blades are cut in farther than their upper ends $b$, whereby their upper ends extend in beyond their lower ends to be attached to the handle in any desired manner, and which also separates the lower inner edges of the cutting blades to form an opening D, at the cutting point as clearly shown in Fig. 1. The object of this is to allow the blades to more freely cut the material being operated upon, for if all of the blades came together at the center, a large cutting surface at one point would be presented, and this would make the knife more difficult to force through the material, than where an opening D is made, as will be readily understood, thus requiring less strength to force the knife through the material being operated upon. If this opening D only was provided, then the cut material would clog therein, and the cutting capacity of the knife would be materially affected disadvantageously. In order therefore to allow a free passage of that portion of the cut material entering the opening D, I cut the blades away as shown at $d$, to form a recess in the inner edge of each blade intermediate its ends which forms together with the opening D an opening at the center of the implement with an enlarged upper end, whereby the material passes freely through the opening D into the enlarged opening G, formed by the cut-away portions $d$. However I find that while the large central opening facilitates and allows the material to pass out from between the blades, this does not relieve or free the knife from the clogging of the material, except that the blade be made of thin material, as here shown and described, whereby they are flexible, and when being used are vibrated by the jar of the knife in chopping, thus shaking loose material from the blade, when it then passes out of the opening G. Were it not for the vibration of the blade, I find that the material would clog in the opening and have to be pushed out by hand. The blades are made narrower by the cutting out so as to leave the opening C, which thereby makes them more flexible and increases the vibration over that which would result if an opening were not provided. This vibration however, would not be sufficient to free the material if the opening were not provided. These cut away portions $d$, are here shown substantially semicircular in form, though they may be of any desired shape, so long as an enlargement of the central opening D is effected, whereby the material passing through the opening D does not become clogged therein, but freely passes on up and out of the enlargement above, as will be clearly understood. As shown I preferably leave the lower inner edges of the blades with a short straight portion $a$, for the purpose of giving the blades strength at that point. However, it will be understood that the cut-away portion $d$, may start directly at the lower cutting edges of the blades, without in any manner effecting my invention.

Having thus described my invention, what I claim, and desire to cover by Letters Patent, is—

1. A cutter comprising a stem, a series of thin radial blades to permit a vibration thereof, said blades having their upper ends secured directly to the stem, and each blade having an intermediate recess in its inner edge to form a central opening, substantially as shown.

2. A cutter comprising a stem, a series of thin radial blades to permit a vibration thereof, said blades having their upper ends secured directly to the stem, the inner lower edge of each blade having a straight portion $a$, outside a vertical line drawn from the inner edge of the upper end of the blade, and an intermediate recess $b$, to form an enlarged central opening, substantially as shown and described.

In testimony whereof I affix my signature in presence of two witnesses.

OLIVER AVERY.

Witnesses:
WILLIAM W. HARE,
THOMAS MURRAY.